United States Patent [19]

Palmersten et al.

[11] Patent Number: 5,318,734
[45] Date of Patent: Jun. 7, 1994

[54] THIN URETHANE PANELS HAVING DOUBLE ACTING HINGE

[76] Inventors: Michael Palmersten, 3110 Hillside La., Safety Harbor, Fla. 34695; Walter A. Coomes, 7909 N. Habana, Tampa, Fla. 33614

[21] Appl. No.: 895,980

[22] Filed: Jun. 9, 1992

[51] Int. Cl.$^5$ .................. B32B 5/20; B32B 31/18; G09F 1/00
[52] U.S. Cl. .................. 264/46.5; 156/79; 40/535; 264/46.6; 428/71
[58] Field of Search ............. 156/79; 264/46.5, 46.6; 428/52, 71, 304.4; 40/535, 536

[56] References Cited

U.S. PATENT DOCUMENTS

| | | | |
|---|---|---|---|
| 1,568,060 | 1/1926 | Craig | 40/535 |
| 3,090,078 | 5/1963 | Ackles | 264/46.5 |
| 3,161,911 | 12/1964 | Mathews | 264/46.5 |
| 3,389,196 | 6/1968 | Stahl | 264/46.5 |
| 3,560,285 | 2/1971 | Schroter | 156/79 |
| 3,959,050 | 5/1975 | Hooper | 156/79 |
| 4,025,687 | 5/1977 | Wooler | 264/46.5 |
| 4,539,241 | 9/1985 | Kainulainen | 428/71 |
| 4,588,541 | 5/1986 | Fowler | 264/46.5 |
| 4,721,644 | 1/1988 | Mayo | 428/71 |
| 4,883,692 | 11/1989 | Spector | 428/71 |
| 4,982,683 | 1/1991 | Earnest | 40/536 |

FOREIGN PATENT DOCUMENTS 0232843 12/1984 Japan .................. 264/46.5

*Primary Examiner*—Michael W. Ball
*Assistant Examiner*—Daniel J. Stemmer
*Attorney, Agent, or Firm*—Joseph C. Mason, Jr.; Ronald E. Smith

[57] ABSTRACT

A method and apparatus for making thin panels having a urethane core and hinges for interconnecting them. A frame is secured to a support bed, and a sheet of paper is placed inside the frame into overlying relation to the bed. Plural board members are then placed inside the frame so that they overlie the peripheral borders of the sheet of paper and so that they are held in position by the frame. Tubular members are positioned in bores formed in the board members so that they extend into the area bounded by the extrusion members, and the innermost end of the tubular members are taped over to prevent foam intrusion. A second sheet of paper is then placed over the frame and a rigid top plate is lowered into overlying relation to the second sheet of paper so that the frame is sandwiched between the bed and the top plate. Foam is then injected into the cavity defined by the board members and the sheets of paper through a port formed in a board member. After the foam has cured, the top plate is raised and the completed panel is removed from the bed. A tool is used to form a bore at the innermost ends of each tubular member to accommodate a retainer clip that engages the innermost end of its associated tubular member, and a bungee cord is extended between opposing retainer clips in adjacent panels to form a double-acting hinge between the panels.

7 Claims, 14 Drawing Sheets

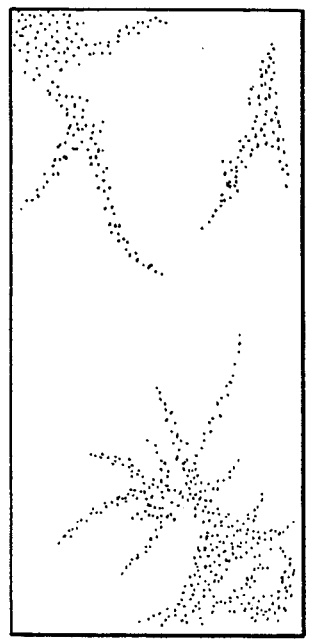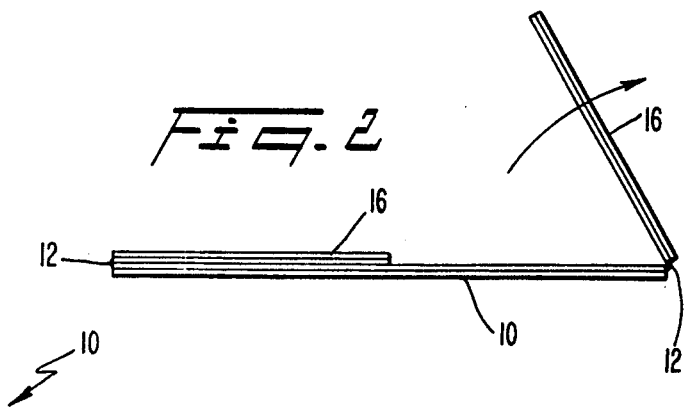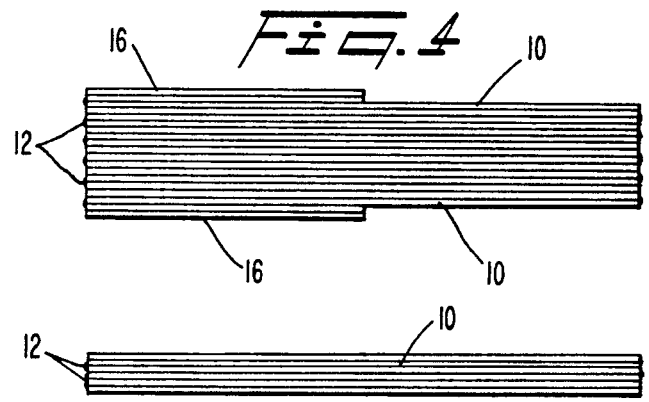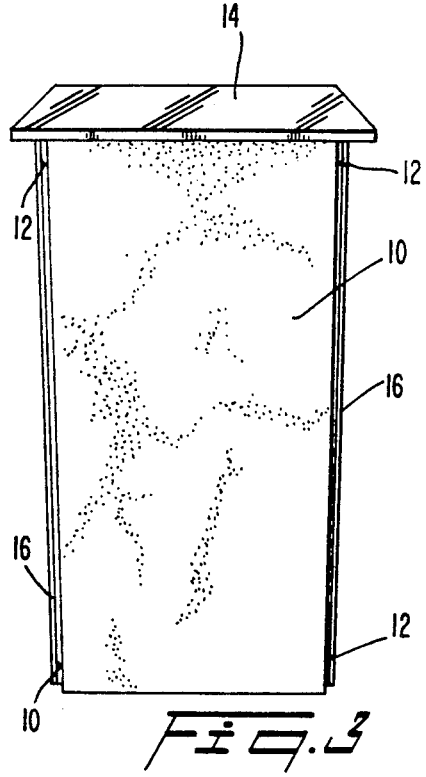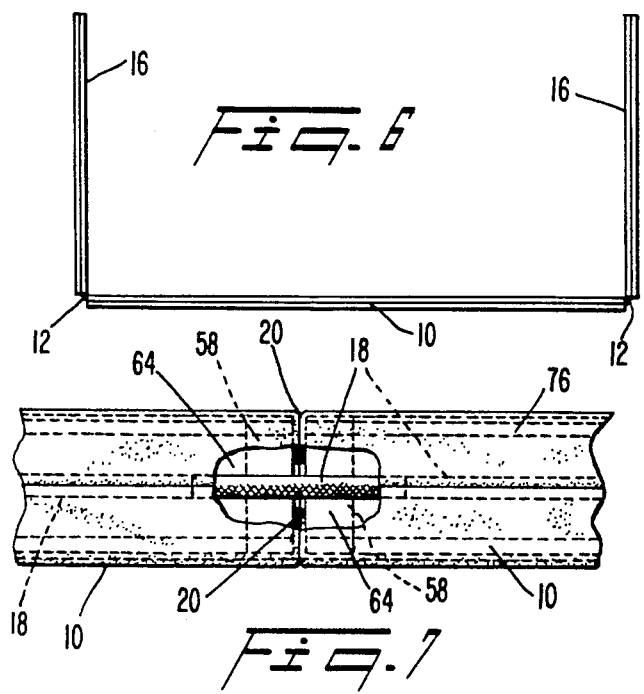

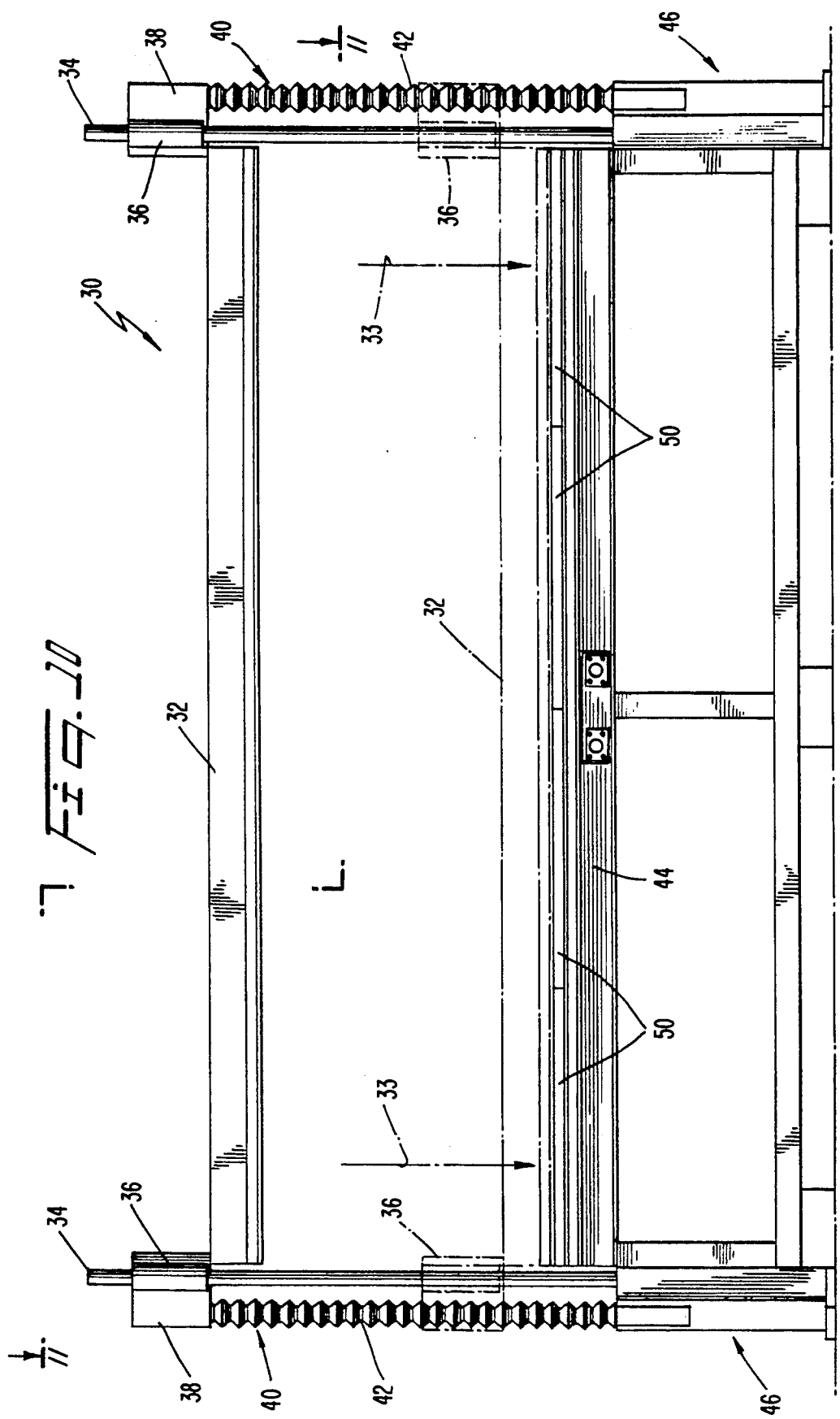

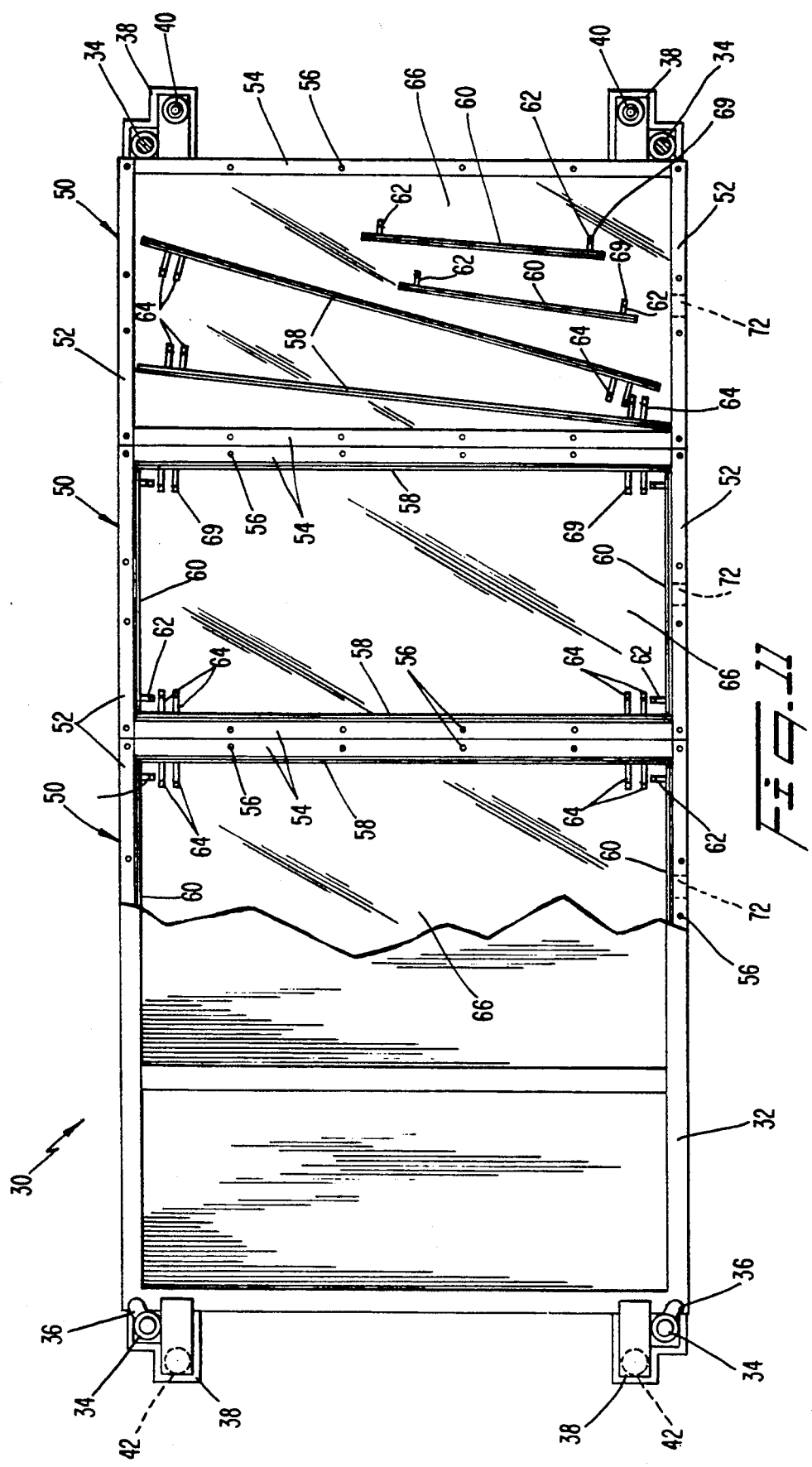

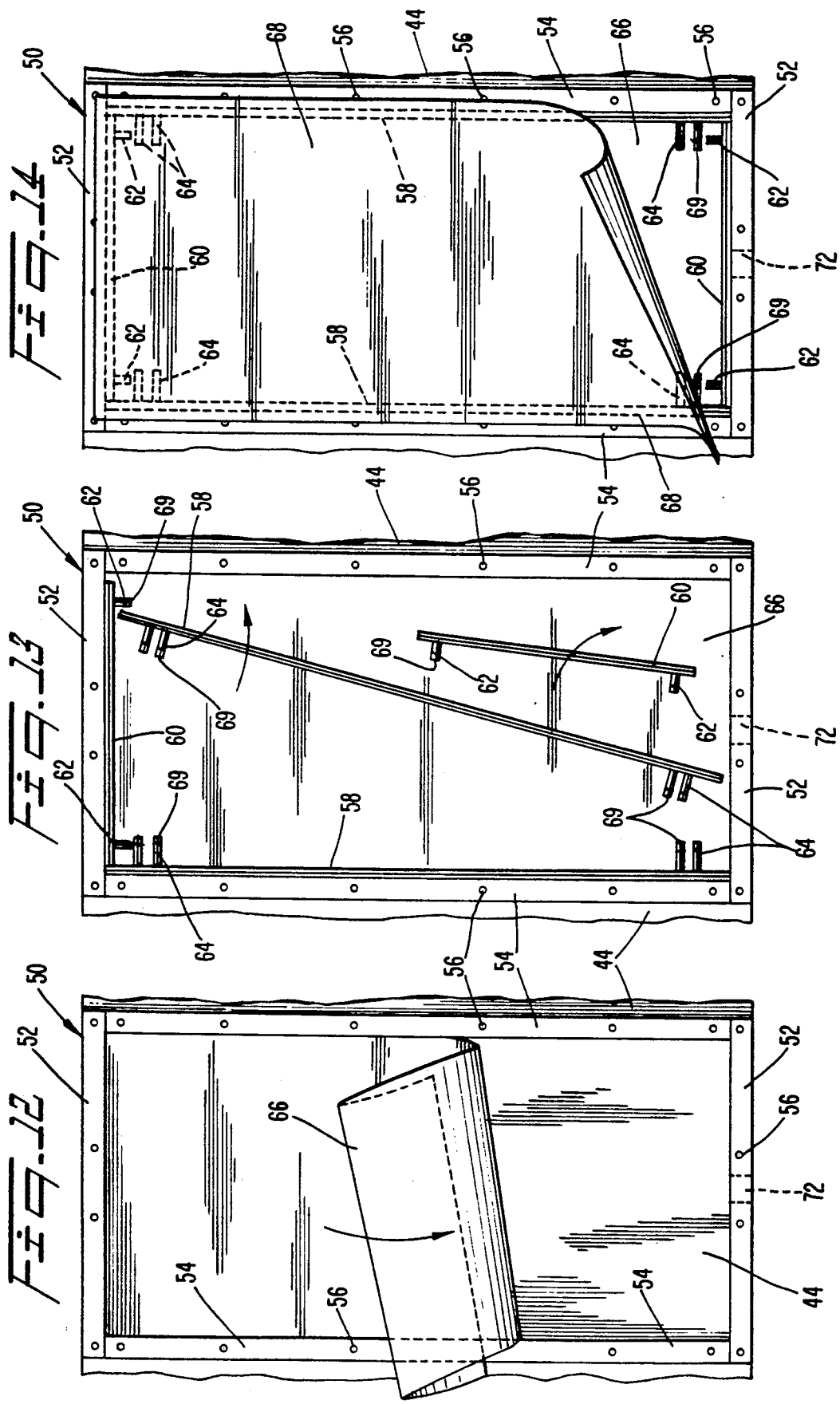

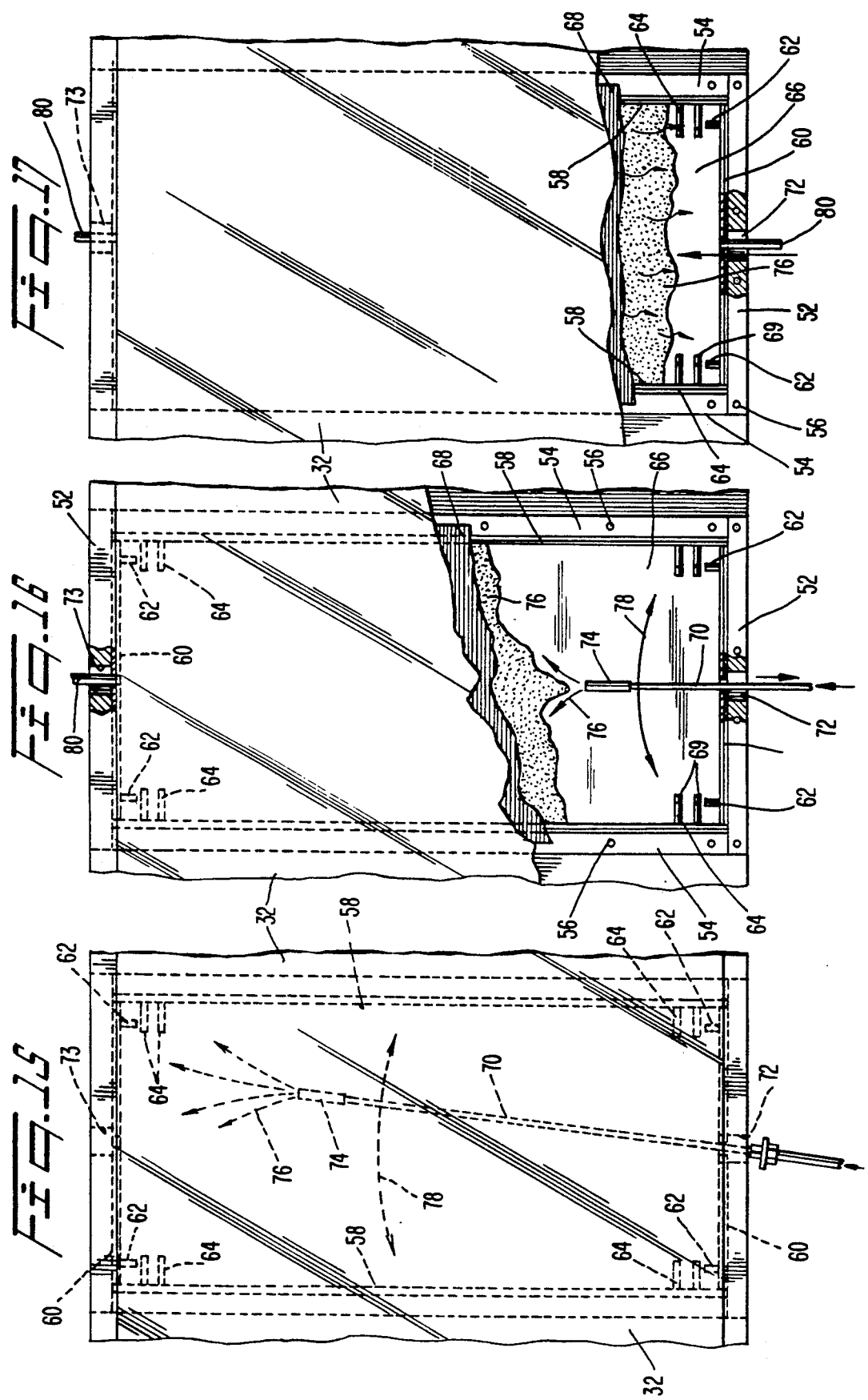

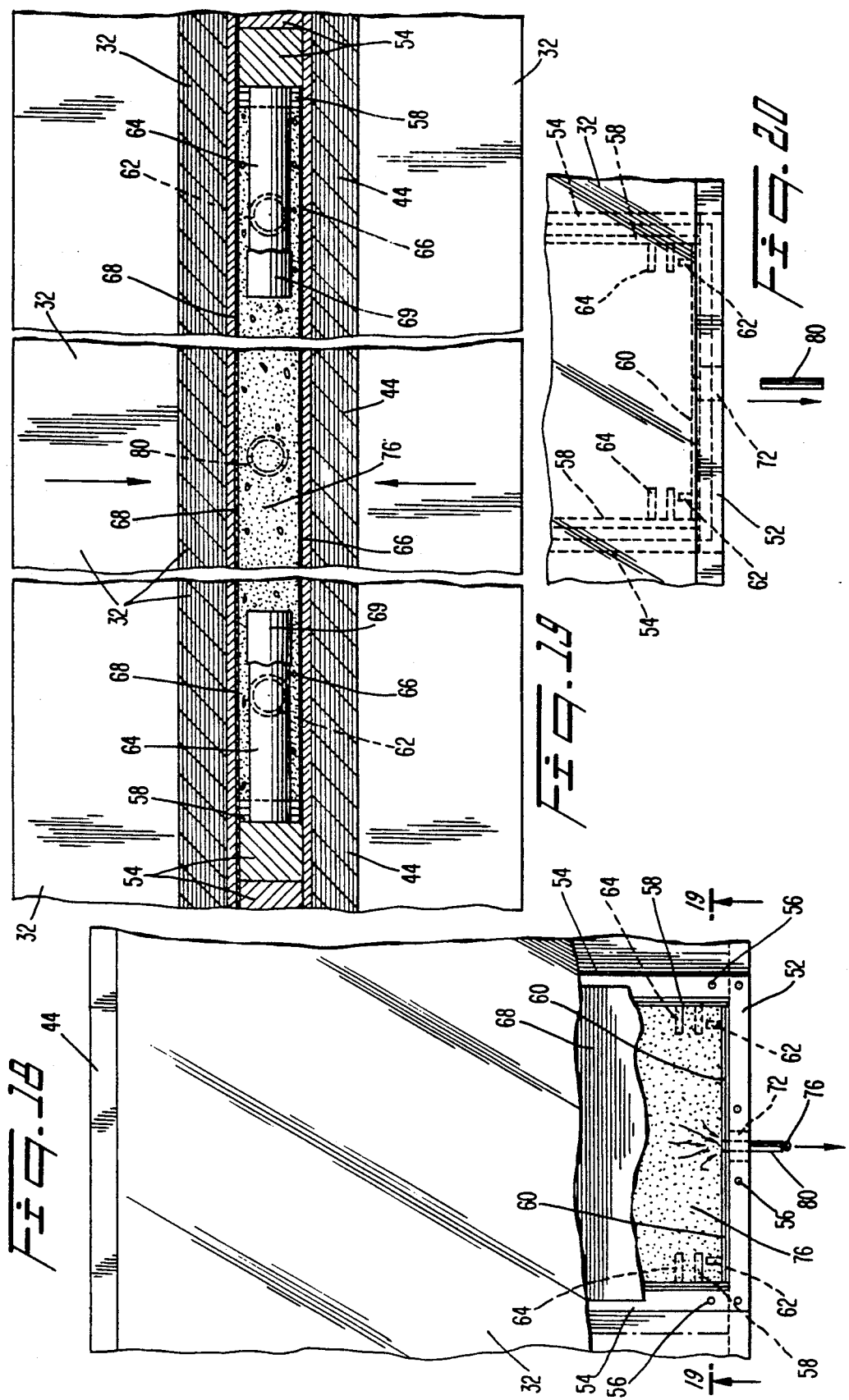

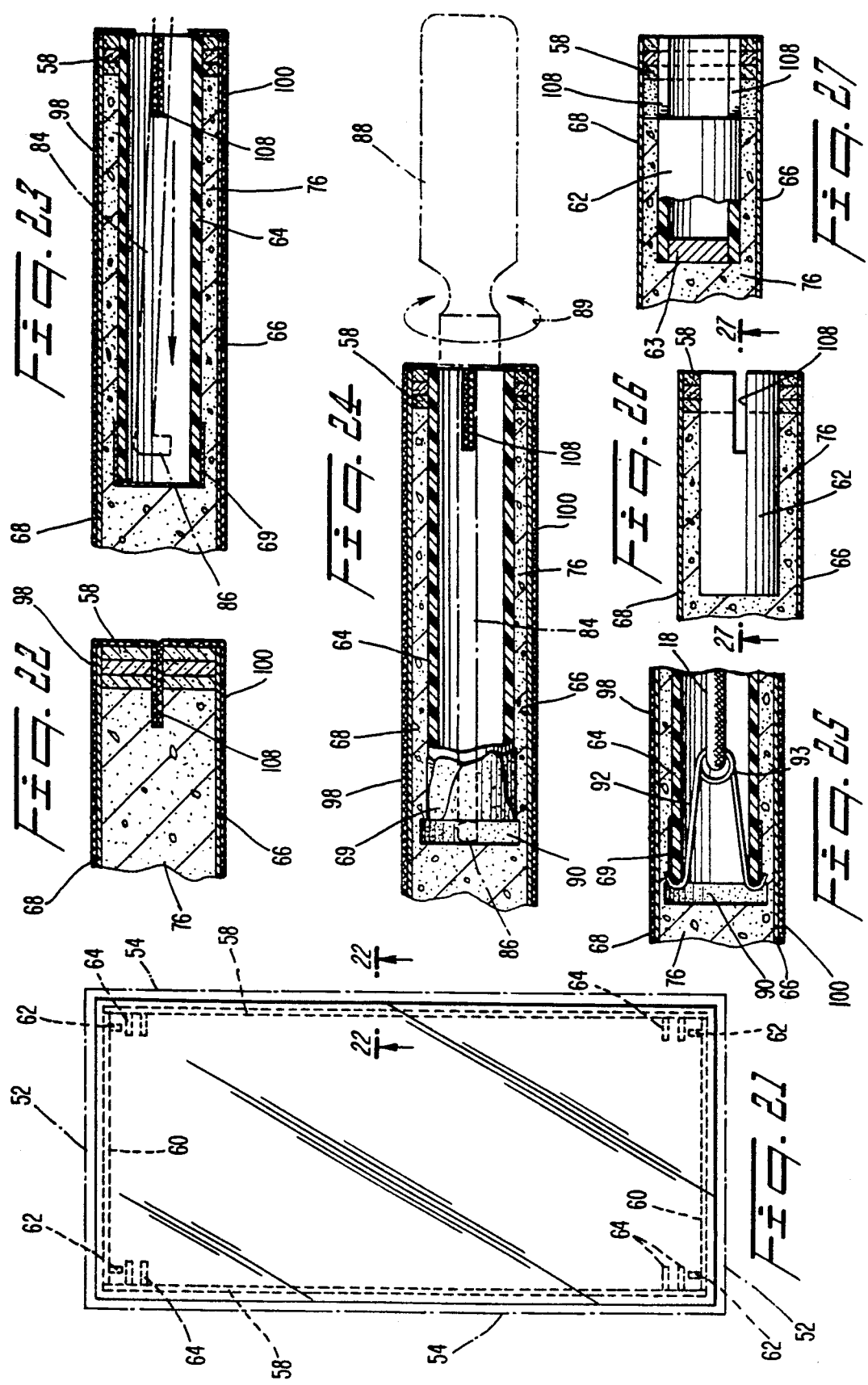

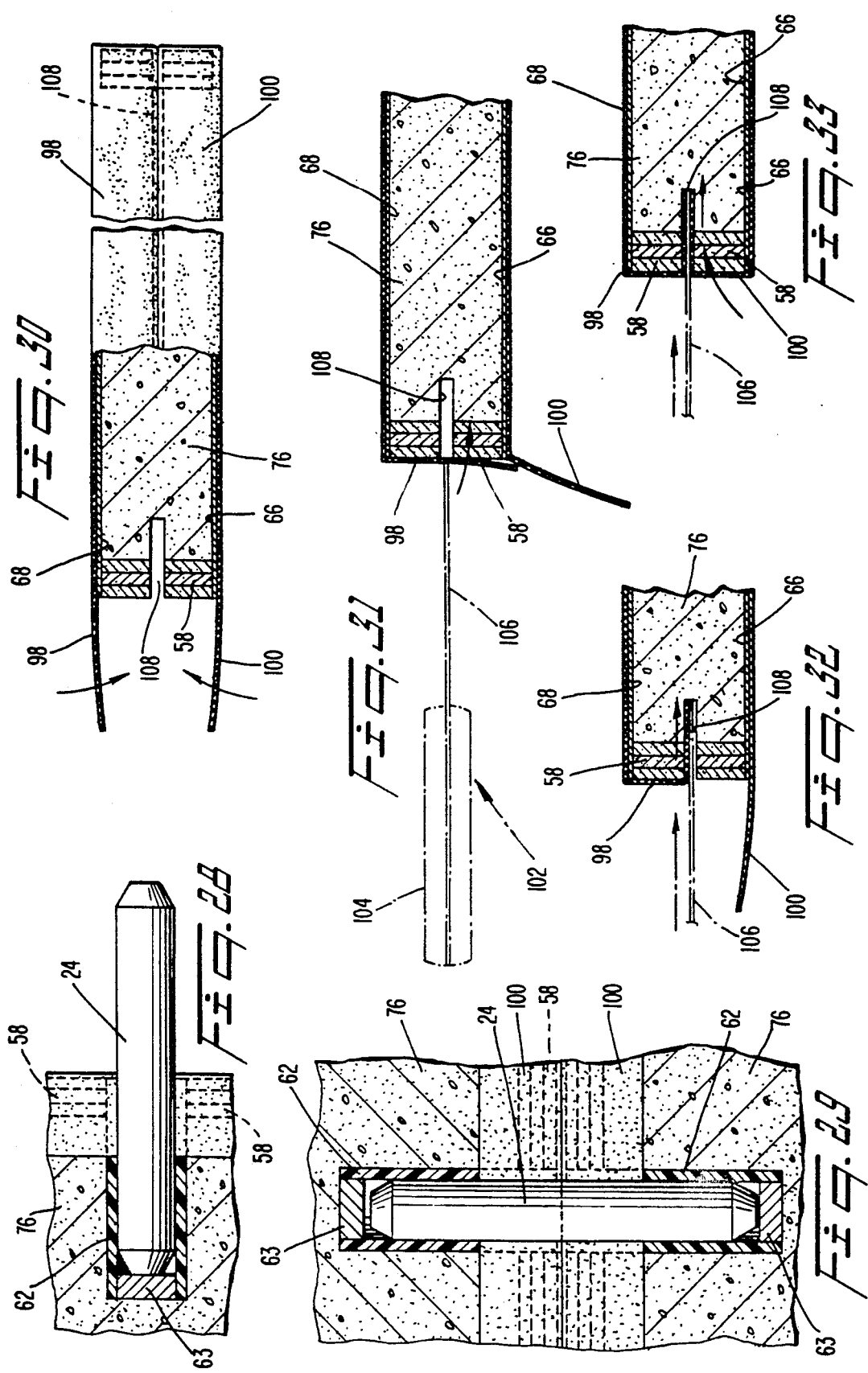

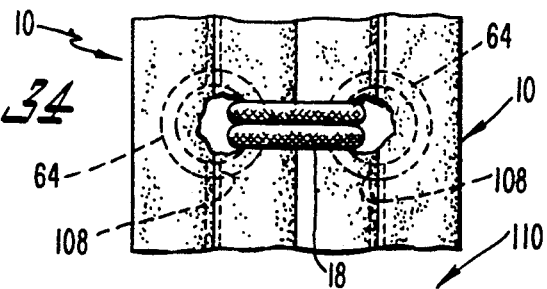
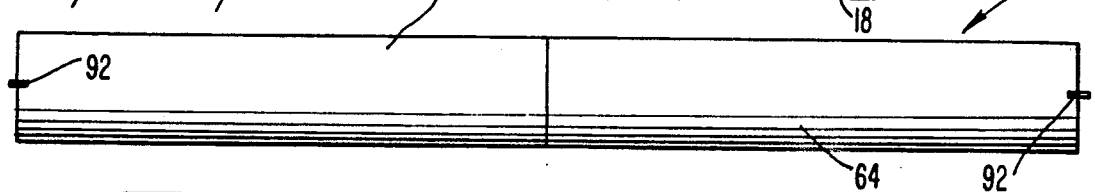
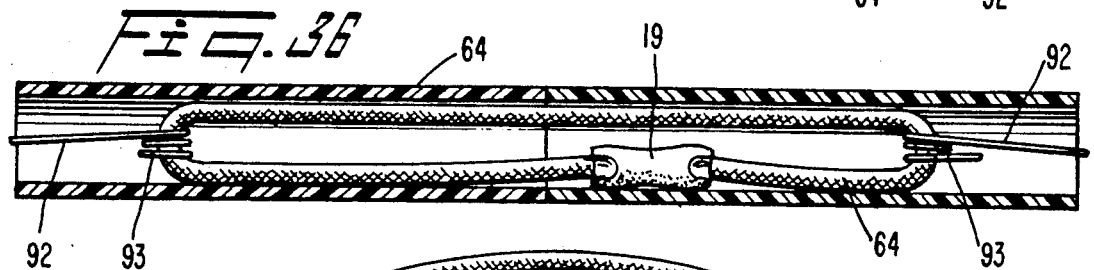
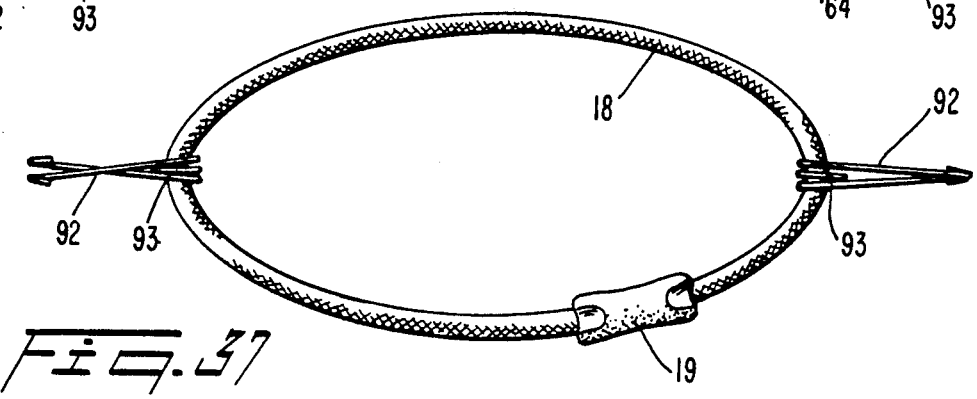
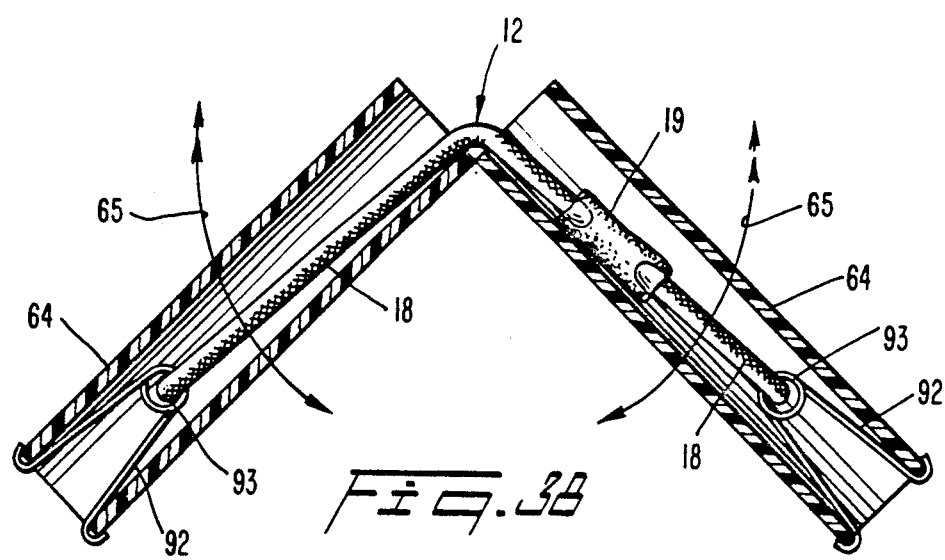

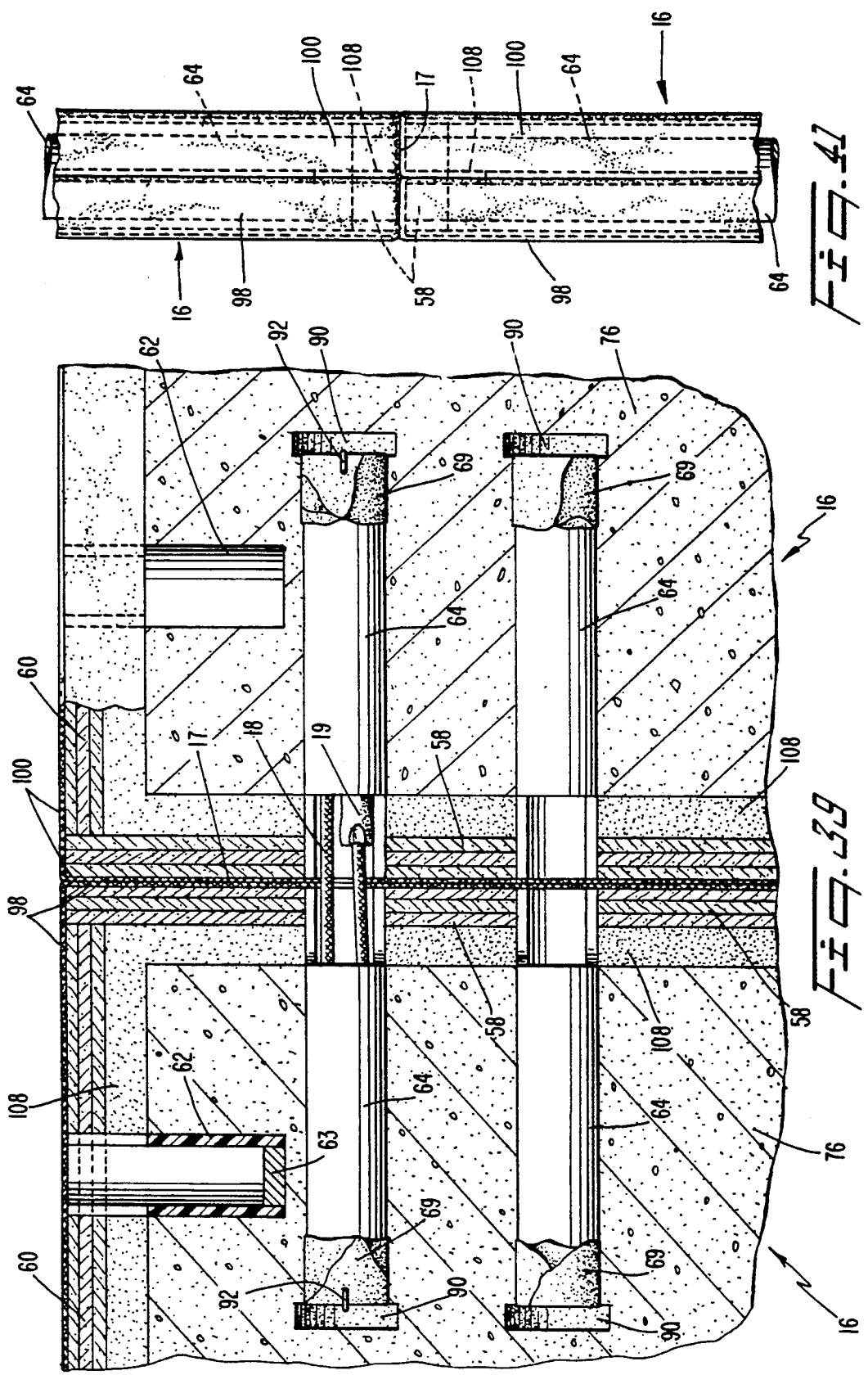

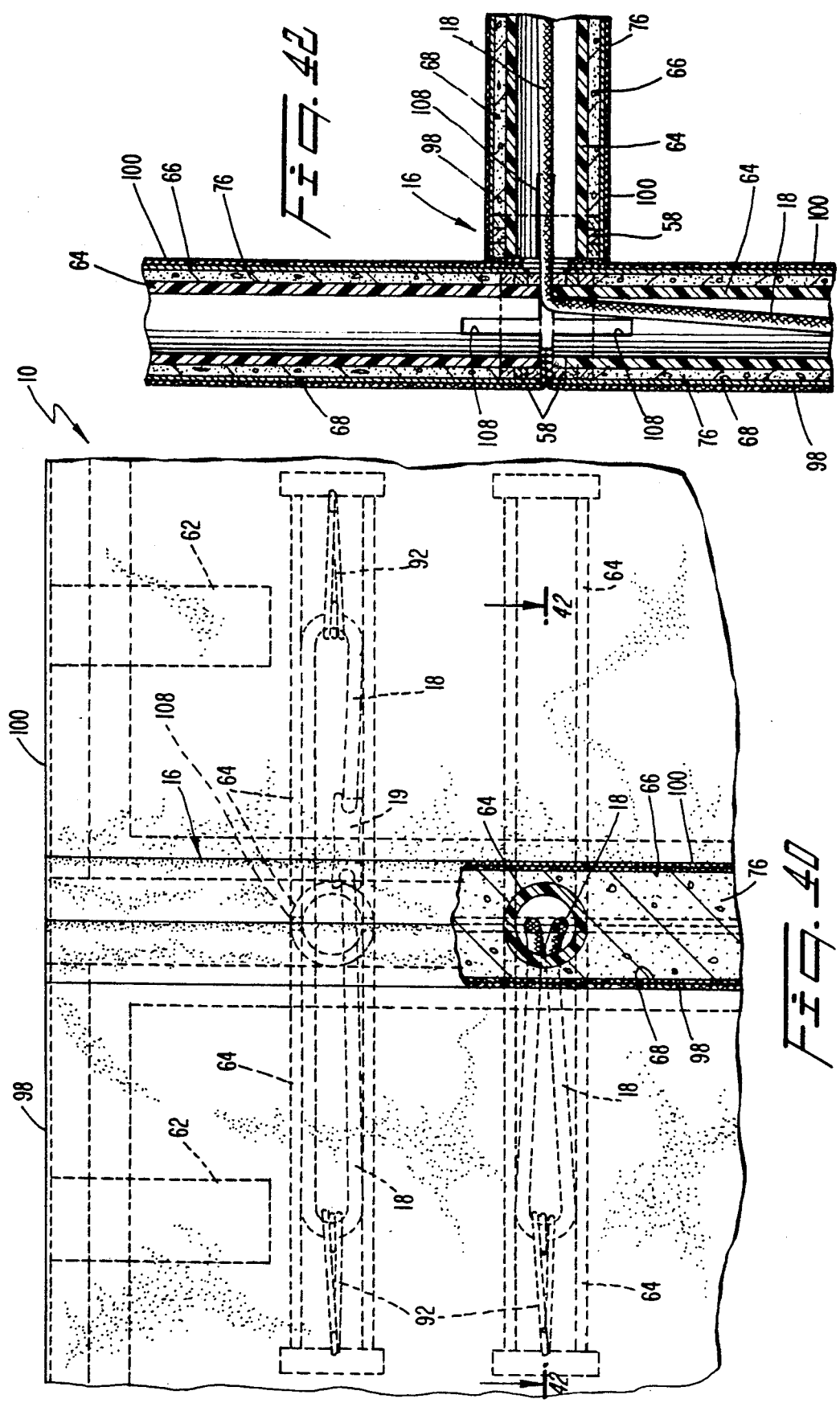

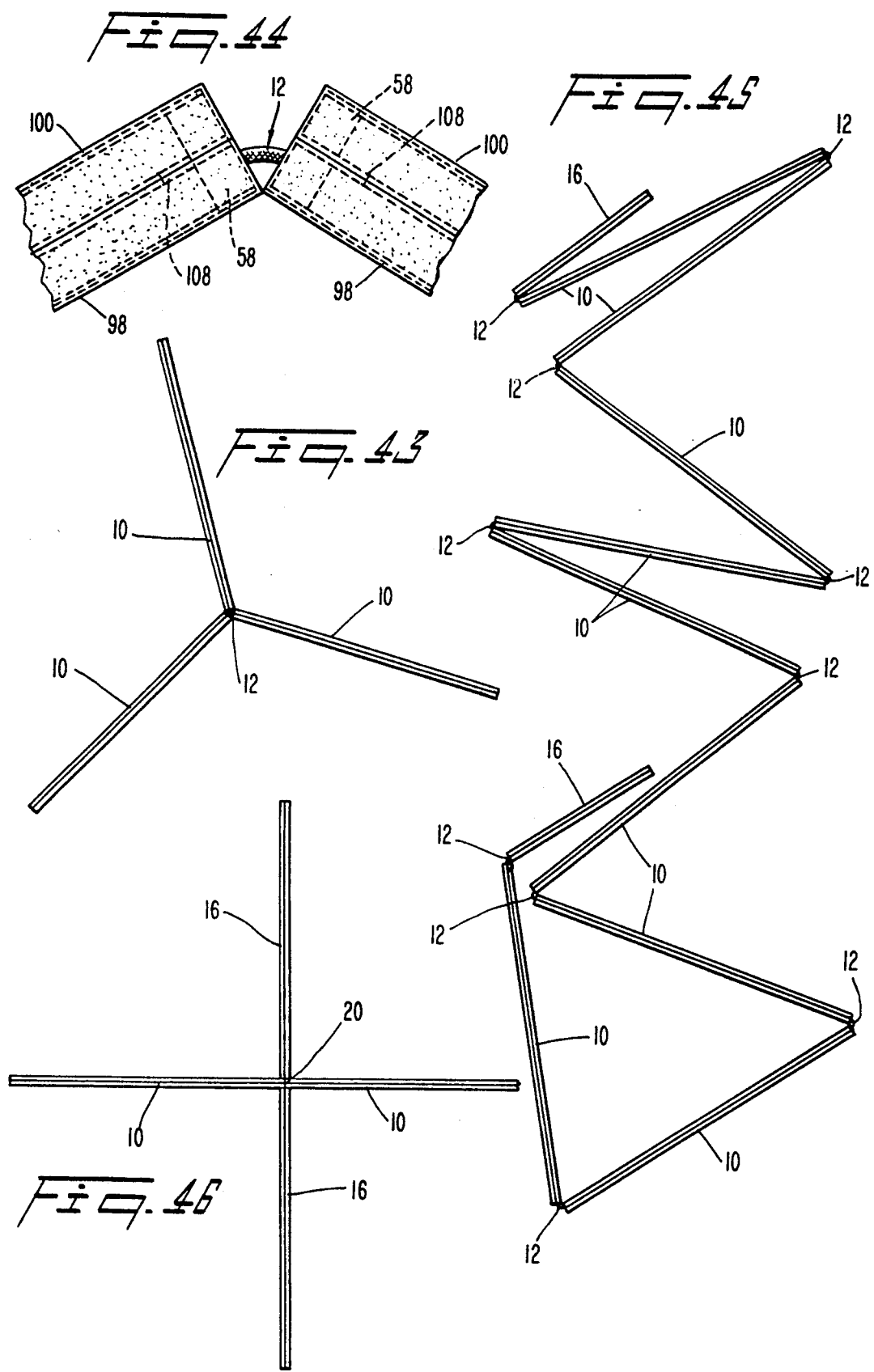

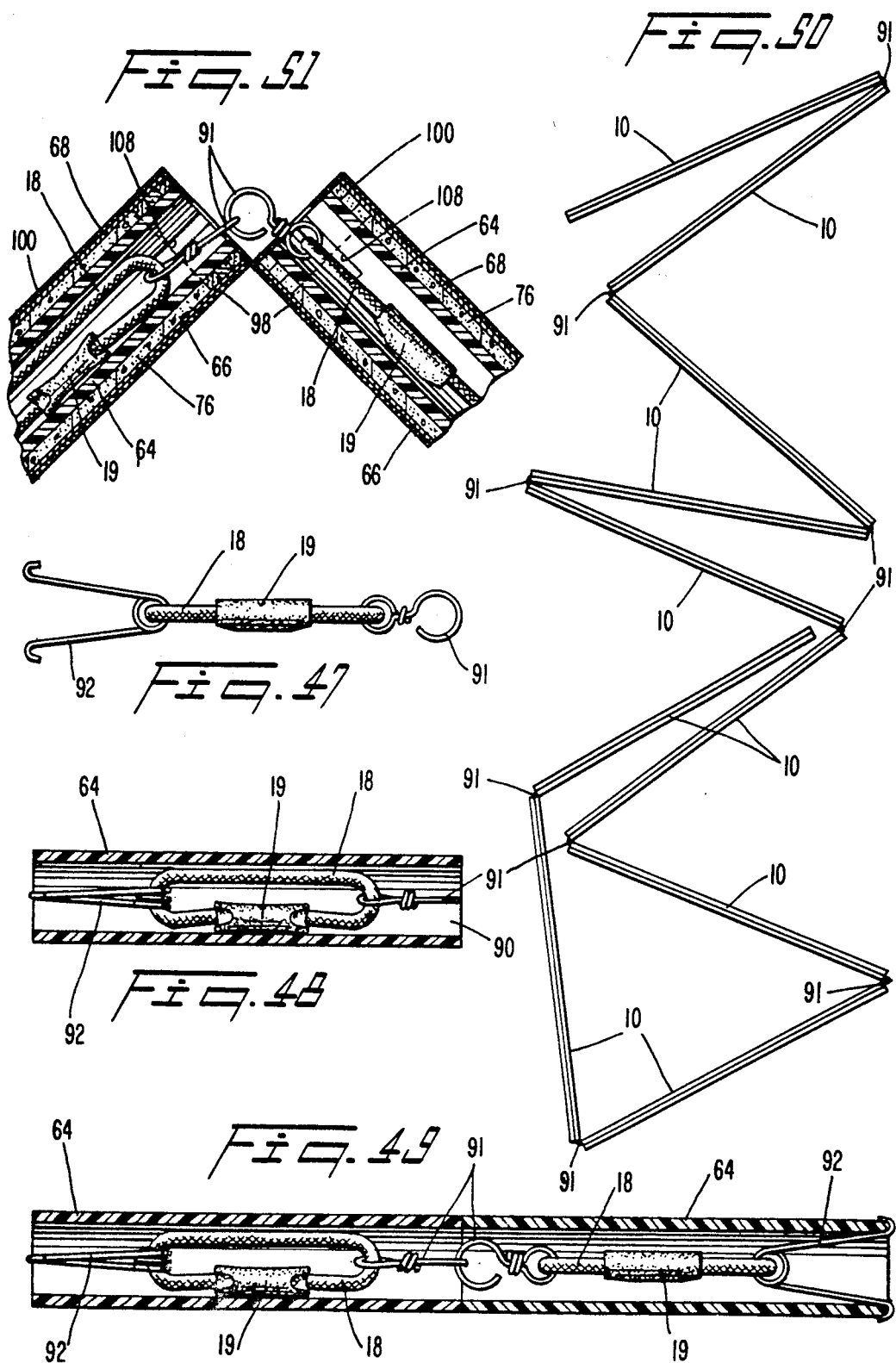

THIN URETHANE PANELS HAVING DOUBLE ACTING HINGE

BACKGROUND OF THE INVENTION

1. Technical Field

This invention relates, generally, to the art of making rigid panels. More particularly, it relates to the art of making thin panels having urethane cores. It also relates to a flexible hinge construction that enables edge-to-edge hinged interconnection of display panels.

2. Description of the Prior Art

Rigid panels are used in a wide variety of ways. Sales personnel, for example, often build information displays that employ such panels. Since sales personnel often travel extensively, it is important that the display panels they use be light in weight and easily transportable. Moreover, it is important that the panels be easily deployed and that the display, when fully set up, is attractive.

Most display panels are rectangular in configuration and are usually a little more than a centimeter in thickness. The flat display surfaces are usually covered by a suitable material.

The core of a typical display panel might be made of expanded polystyrene because that material is light in weight and reasonably durable, but the manufacturing of polystyrene is apparently detrimental to the ozone layer and efforts are under way to ban such manufacturing. Another common core material is corrugated cardboard, but the peripheral edges of display panels made from that material are unsightly.

Panels having urethane foam cores have also been made, but such panels are usually more than seven centimeters in thickness; accordingly, such panels are commonly used in the construction of walk-in freezers or refrigerators.

Attempts have been made to use urethane in the construction of thin display panels, but no successes were reported by others before the filing of this disclosure. Urethane expands upon curing, and molds designed to make thin panels from urethane have proved to be unsatisfactory because the expansion of the foam simply destroys such molds. If the problem is solved by admitting very small quantities of urethane into the mold so that the subsequent expansion does not break the mold, the resulting panel has too many large voids therewithin for an acceptable product. The problem is so intractable that the conventional wisdom in the panel making and the urethane industries is that thin panels of the type having utility as display panels will never be made from urethane.

There is a need for a sturdy, light-in-weight display panel having a urethane foam core, but the prior art, when considered as a whole in accordance with the requirements of law, neither teaches nor suggests how the need could be fulfilled.

There is also a need for an improved way to hingedly interconnect the novel panels and display panels, in general.

The common hinge is well known, but it is unsatisfactory for use with display panels. It includes a central post having a round cross section and a pair of flat leaf members each of which has a plurality of cylindrical post-receiving members formed along a preselected edge thereof. The plural cylinders interleave with one another when the hinge is assembled and the post is slidably received within the bore collectively defined by said cylindrical members.

The common hinge is typically of metallic or plastic construction and as such is not flexible. Moreover, the common door hinge enables the hinged door to open in one direction only, i.e., the common hinge is not double acting. If the common hinge is employed to hingedly interconnect flat members such as display panels, the hinge will not only be visible and thus detract from the aesthetics of the display, but a pronounced seam between adjacent panels will also be visible.

There is a need, therefore, for a double acting hinge capable of interconnecting panels or other flat members in edge-to-edge relation to one another. The ideal hinge would also be hidden from view and would allow edge-connected panels to seamlessly abut one another, but the prior art, taken as a whole, neither teaches nor suggests how such a hinge could be provided.

SUMMARY OF THE INVENTION

An apparatus capable of making a plurality of thin urethane core display panels at one time includes an elongate rectangular bed that is subdivided into plural, contiguous panel-making stations.

Each panel-making station is rectangular and is defined by rigid frame members that are fixedly secured to the bed. Plywood boards are pre-cut to size and are positioned inwardly of the immovable frame members and are thus held in position by said frame members. In the preferred embodiment, each group of four extrusion members collectively frame the display panel to be produced. However, panels of any polygonal configuration are within the scope of this invention.

At least a pair of longitudinally space apart through-bores are formed in each of the plywood boards, and a hollow tubular member is inserted into each bore so that its outermost end is flush with the outermost surface of each plywood board. The innermost end of each tube is closed with masking tape or other suitable closure means to prevent introduction of urethane into the hollow interior of said tubes. The tubes mounted in the long boards form a part of the novel hinging means, and the tubes mounted in the short boards form a part of the means for stacking the finished panels.

A first sheet of paper or other suitable sheet of flexible sheet material is then placed into overlying relation to the bed of the apparatus, said first sheet being pre-cut so that its width and length are equal to that of the space framed by each group of four frame members. The plywood boards are then placed into overlying relation to the first sheet of paper and in abutting relation to their associated frame members so that said frame members prevent outward movement of said boards during foam expansion. A second sheet of paper or other suitable material of the same or greater width and length than the first sheet is then placed into overlying relation to the four plywood boards and their associated frame members, and a monolithic cover or top plate member having the same dimensions as the bed is lowered into overlying registration with the second sheet of paper and tightly bears against it and thus presses downwardly on the plywood board members as well. In this manner, the assembly of frame members, plywood board members, and first and second sheets of sheet material is sandwiched between the bed and the top plate; the bed and the top plate are formed of a rigid, hard, inflexible material that does not give when subjected to expansion pressures generated by expanding urethane foam or other expandable foams.

An upper expansion port in the form of a throughbore is formed mid-length of a first preselected plywood board and associated frame member; a similar throughbore is formed in a second preselected plywood board that is opposed to said first preselected board. Said second throughbore serves as a second expansion port and also as the injection port.

An elongate injection wand is introduced into the injection port and the nozzle of the wand is positioned near the remote end of the cavity defined by the plywood board members, and the sheets of paper that are backed by the bed and cover as aforesaid. Urethane foam is introduced through the nozzle at low pressure, and the end of the nozzle is slowly swept in a reciprocating lateral motion in a horizontal plane to allow the cavity to slowly fill with urethane. The wand is retracted as the cavity fills, but the sweeping motion is maintained. When the cavity is about ninety five per cent filled with urethane foam, the flow of said foam thereinto is shut off and the wand is retracted from the injection port. A hollow tube is then placed into the injection port, and the urethane, after it has completely filled the cavity, expands into the tube and travels therethrough. When expansion ends, the tube is snapped off and the urethane therewithin is separated from the urethane which remains sandwiched between the bed and top plate and the plywood board members. The top plate is then raised and the substantially completed panel is removed from the apparatus.

A rotating tool is then introduced into each hollow tube that will become a part of the novel hinge means. The tool breaks through the masking tape and drills a bore into the urethane at the innermost end of each tube. The bore so drilled has a diameter slightly greater than the outside diameter of the hollow tube. The purpose of the bore is to provide clearance space for the hooked legs of a piano wire retainer clip or anti-retraction means that is inserted into each hollow tube from its outermost end. The legs of each clip are biased radially outwardly so that the hooks formed at the ends thereof spring radially outwardly and engage the innermost end of their associated tube upon entry into the bore created by the rotating tool.

A saw cut is then made along the longitudinal extent of the outermost edge of each plywood board and a coating of adhesive is applied to each edge.

A layer of felt or other suitable display panel surface material is then adhered to each flat display surface of the panel and a putty knife or similar tool is employed to stuff the ends of each piece of felt material into the saw cuts, and the individual display panel construction is completed.

Panels placed in lateral relation to one another are interlocked along a novel flexible hinge by extending a bungee cord or other elastomeric material between opposing retainer clips, thereby creating a double-acting hinge.

More particularly, in a preferred embodiment of the present invention, the novel hinge is employed to hingedly interconnect a pair of laterally disposed display panels positioned in abutting, edge-to-edge relation to one another.

In a first embodiment of the novel hinge apparatus, a pair of tubular members are embedded in confronting edges of a pair of the novel panel members so that the tubular members are in axial alignment with one another and so that the respective outermost ends of each tubular member are in open communication with the respective abutting panel edges. An elastomeric member of looped construction has a first innermost end thereof engaged by a first anti-retraction means and said first anti-retraction means has an innermost end that engages the innermost end of the first tubular member; the second innermost end of said elastomeric member is engaged by a second anti-retraction means having an innermost end that engages the innermost end of the second tubular member. Thus, the elastomeric member is stretched between the two panels, and its midpoint is bisected by the parting line between the two panels.

When the hingedly interconnected panels are disposed in a common plane, the hinges therebetween are completely hidden from view. Due to the elasticity of the elastomeric member, a first panel may be folded in a first direction until it is disposed in overlying relation to a first face of its adjacent panel, and, alternatively, it may be folded a second direction until it is disposed in overlying relation to a second face of the adjacent panel. Therefore, it is said that the novel hinge permits three hundred and sixty degree rotation of a flat member that is hingedly connected in edge-to-edge relation to another flat member.

In a second embodiment, a looped end of the elastomeric member protrudes freely from a preselected edge of a first panel and a hook member is carried thereby. A similar hook protrudes from a preselected edge of a second panel, and the two panels are hingedly interconnected by interconnecting the protruding hooks. In this manner, an endless chain of panels may be joined to one another.

In a third embodiment, a pair of post members disposed in lateral relation to one another are interconnected by a bungee cord that extends between their respective medial points. Thus, the hinge members are "H"-shaped. The posts of these "H"-shaped hinges are press fit into the tubes at the top and bottom edges of laterally abutting panels, near the edge thereof.

The panels may also be vertically stacked by inserting dowel pin members into contiguous tube members on the top and bottom edge of each panel.

It should therefore be understood that a primary object of this invention is to provide an apparatus that produces thin, light-in-weight display panels having a urethane core and to disclose a unique method for making such panels.

Another important object of this invention is to advance the art of double acting hinges.

A more specific object is to advance the art of double acting hinges by disclosing a family of hinge members that interconnect flat panels to one another in a substantially seamless way and in a way whereby the hinge members are not visible when the display panels are disposed in coplanar relation to one another.

Additional important objects, advantages and features of this invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a front elevational view of a display panel made in accordance with the novel method;

FIG. 2 is a side elevational view of the panel shown in FIG. 1, said FIG. 2 revealing that a second and third panel are behind the panel of FIG. 1, hingedly connected thereto and disposed at a one hundred eighty degree angle relative thereto;

FIG. 3 is a perspective view of a table made by using the display panels to form a support structure;

FIG. 4 is a top plan view showing a multi-panel assembly;

FIG. 5 is another top plan view showing three panels in folded configuration;

FIG. 6 is a top plan view showing three panels formed into a "U"-shaped configuration;

FIG. 7 is a detailed top plan view showing a bungee cord extending between two panels disposed in edge-to-edge relation to one another;

FIG. 10 is a side elevational view of the novel apparatus that performs the novel method of making thin urethane core panels;

FIG. 11 is a sectional view taken along line 11—11 in FIG. 10;

FIG. 12 is a top plan view showing the installation of a first sheet of paper into a frame supported by the bed of the apparatus shown in FIG. 10;

FIG. 13 is a top plan view showing the installation of the plywood board members within the frame shown in FIG. 12;

FIG. 14 is a top plan view showing the installation of a second sheet of paper into overlying relation to the plywood board members and to the frame;

FIG. 15 is a top plan view depicting the laterally-directed sweeping motion of the low pressure urethane injection nozzle;

FIG. 16 is a view similar to FIG. 15, but showing the filling of the cavity defined by the first and second sheets of FIGS. 12 and 14 and the concomitant withdrawal of the wand;

FIG. 17 is a view similar to FIGS. 15 and 16, but showing the wand withdrawn and a hollow tube installed in the injection port;

FIG. 18 is a top plan view similar to FIG. 17, but showing the top plate of the apparatus lowered into overlying relation to the frame;

FIG. 19 is a side elevational and partially sectional view showing the sandwiching of the novel urethane core panel between the bed of the apparatus and the top plate thereof;

FIG. 20 is a top plan view depicting the removal of the hollow tube shown in FIG. 17 and thus the breaking off of the urethane therewithin;

FIG. 21 is a top plan view of a completed panel;

FIG. 22 is a sectional view taken along line 22—22 in FIG. 21;

FIG. 23 is a sectional view showing the insertion of a novel boring tool into a tubular member that is embedded within a longitudinal edge of the novel panel;

FIG. 24 is a view similar to FIG. 23, showing the novel boring tool being rotated to form a bore at the innermost end of the tubular member;

FIG. 25 is a sectional view similar to FIG. 24, showing the clip or anti-retraction means that holds an innermost end of a bungee cord within the tubular member;

FIG. 26 is a detailed view of a tube in a transverse edge of a panel member into which a dowel pin is press fit when contiguous panels are vertically stacked;

FIG. 27 is a sectional view taken along line 27—27 in FIG. 26;

FIG. 28 is a detailed view similar to FIG. 26 but showing a dowel pin member positioned within the tube;

FIG. 29 is a detailed view showing a single elongate dowel pin member received within a pair of confronting tubes;

FIG. 30 is a side elevational, partially sectional view showing the novel panel disposed in sandwiched relation to a pair of sheets of felt;

FIG. 31 is a side elevational view similar to FIG. 30, showing the use of a common tool in positioning the felt within the saw cut channel;

FIG. 32 is a view similar to FIG. 31, showing further use of the tool;

FIG. 33 is a view similar to FIG. 32, showing further use of the tool;

FIG. 34 is a side edge view of a pair of the novel panels when folded into one hundred eighty degree angular relation to one another;

FIG. 35 is a side elevational view of the novel tubular housing members disposed in abutting, axial alignment relation to one another;

FIG. 36 is a longitudinal sectional view of the parts shown in FIG. 35;

FIG. 37 is a side elevational view of the looped bungee cord, showing its opposite, innermost ends engaged by anti-retraction members;

FIG. 38 is a longitudinal sectional view of the parts shown in FIG. 35 when the tubular members are angularly disposed with respect to one another;

FIG. 39 is a side sectional view showing the positioning of the plywood board members and tubular members when a pair of panels are disposed in abutting relation to one another;

FIG. 40 is a sectional view showing the tubular members embedded within their respective panel members and showing auxiliary tubular members for providing an additional hinge axis;

FIG. 41 is a top plan view of the parts shown in FIG. 39;

FIG. 42 is a sectional view showing the parts in FIG. 40;

FIG. 43 is a top plan view showing the panels disposed in radially arrayed relation relative to one another;

FIG. 44 is view similar to FIG. 41, but showing the panels rotated in relation to one another;

FIG. 45 is a plan view of an array of panels made possible by the provision of auxiliary hinge tubes;

FIG. 46 is a plan view of another radial array made possible by said auxiliary hinge tubes;

FIG. 47 is a side elevational view of a second embodiment of the elastomeric member;

FIG. 48 is a sectional view of the member of FIG. 47 when disposed in a tubular member;

FIG. 49 is a sectional view similar to FIG. 48, but showing a pair of axially aligned tubular members when their respective hook members are engaged to one another;

FIG. 50 is a top plan view of a series of display panels interconnected by the hooked member of the second embodiment; and FIG. 51 is a view similar to FIG. 38, but showing use of the hook members.

Similar reference numerals refer to similar parts throughout the several views of the drawings.

DETAILED DESCRIPTION OF THE PREFERRED EMBODIMENT

Figure 8:
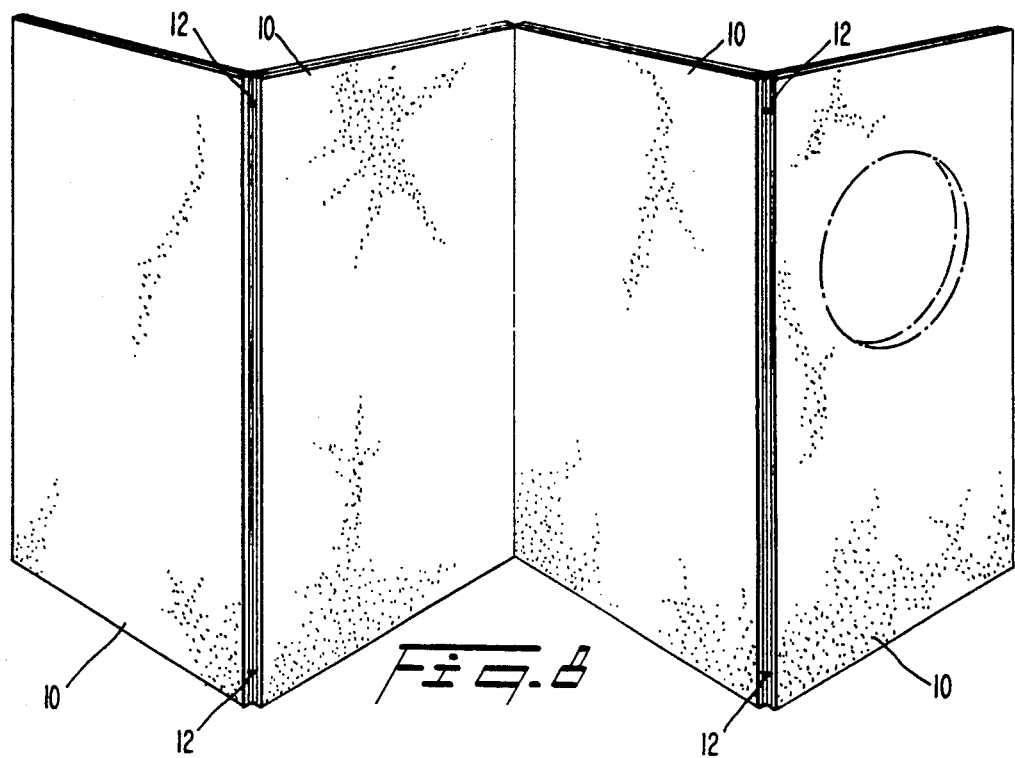
FIG. 8 is a perspective view showing the novel urethane core panels in a typical display configuration.

Referring now to FIG. 1, it will there be seen that a rectangular display panel of the type made by the novel apparatus in accordance with the steps of the novel method disclosed herein is denoted as a whole by the reference numeral 10. It should be understood that square and other polygonal panels are taught by this disclosure as well because the steps of the novel method can be followed to make display panels of hexagonal or other polygonal shapes in addition to the rectangular shape shown.

FIG. 2 is a top plan view showing three panels, all of which are denoted 10, that are hingedly interconnected adjacent their respective top and bottom edges by a pair of double acting hinges, collectively denoted 12, that are shown and described in more detail hereinafter.

FIG. 3 shows a platform 14 supported by three panels 10 when arranged in the pattern shown in FIG. 6.

FIG. 4 shows that the panels need not be of the same size; more particularly, panels 16, 16 are half the transverse extent of panels 10.

FIG. 5 shows three panels of common transverse extent hingedly interconnected as shown by the novel double-acting hinges.

FIG. 7 is a top plan view showing a couple of panels 10 positioned in a common plane and disposed in edge-to-edge abutting relation to one another; when so disposed, bungee cord 18 that forms a part of the hinge is not visible, and the abutting panels meet at a parting line 20 that is not readily visually ascertainable and the hinged joint should thus be understood as being substantially seamless.

FIG. 8 depicts an arrangement of panels where the hinges 12 of the outermost panels are visible but where the center hinges are not, due to the particular pattern of angular deployment depicted.

Figure 9:
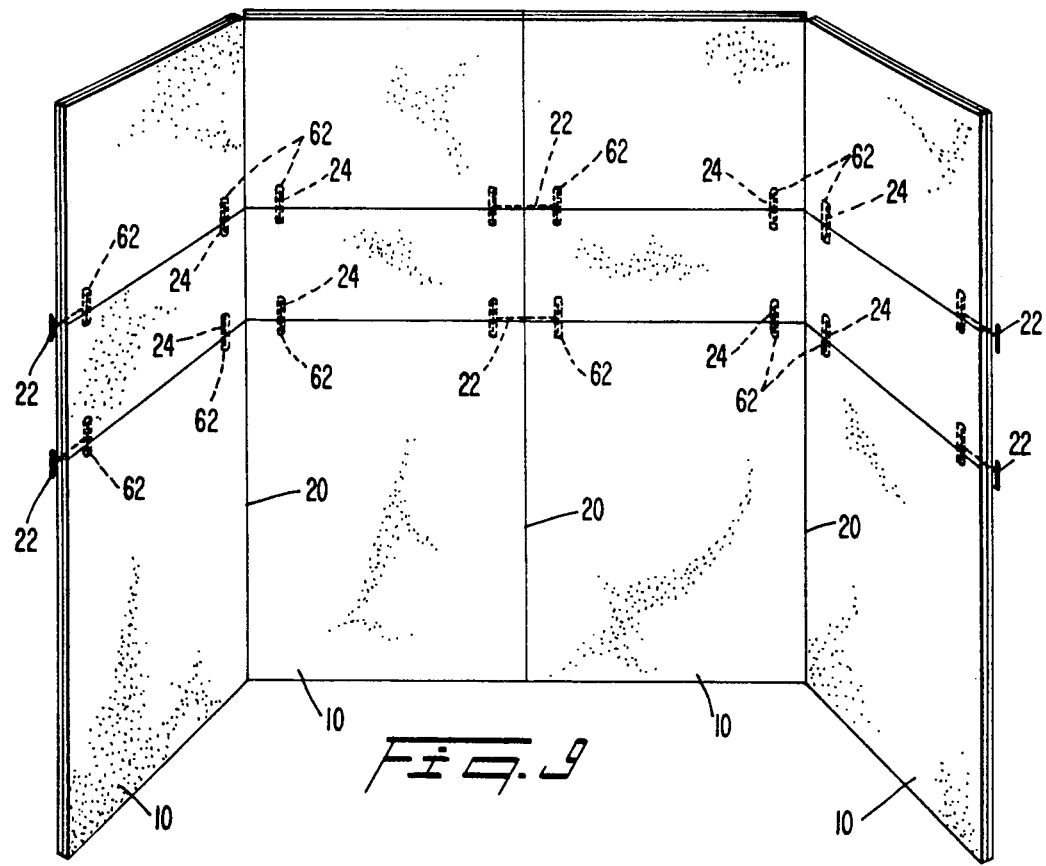
FIG. 9 is another perspective view, showing how the panels may be vertically stacked through the use of dowel pin members and hingedly interconnected by the novel "H"-shaped hinge means.

None of the hinges are visible to an individual positioned in front of the display panels of FIG. 9, and the central seam 20 is essentially invisible. This Fig. also shows "H"-shaped hinge members 22, more fully disclosed hereinafter, that are employed to hingedly key together vertically adjacent panels to facilitate the vertical stacking of hingedly interconnected panels as depicted.

FIG. 10 depicts in side elevation the novel apparatus employed to carry out the steps of the novel method; the apparatus is denoted 30 as a whole and includes a flat, rigid, inflexible top plate 32 of rectangular configuration that is slidably mounted at its four corners onto four upstanding post members, collectively denoted 34, only two of which are visible in this Fig. The downwardly pointing arrows 33 in this Fig. indicate that top plate 32 is moveable downwardly; said plate is also moveable upwardly so that it can return to its raised configuration as shown in this Fig. More particularly, sleeve members 36 slidably engage their respective post members 34, and each of said sleeve members include an integral sleeve 38 that slidably engage post members 40. Post members 40 are telescopically mounted and pneumatically actuated so that when they are retracted, top plate 32 descends as indicated by the above-mentioned downwardly pointing arrows. Accordion means 42 are provided for aesthetic purposes.

A flat, rigid, inflexible, and rectangular bed member 44 is positioned directly below top plate 32 as shown in FIG. 10; it is supported by main frame means denoted 46 as a whole. The edges of four frame members that play an important role in the novel method are visible in FIG. 10 as well; they are collectively denoted 50 and are disposed in overlying relation to bed 44.

The above-described structure of apparatus 30 may be more clearly understood in connection with FIG. 11 which is taken along line 11—11 in FIG. 10. There it will be seen that each frame 50 includes a pair of elongate, longitudinally disposed frame members 52 and a pair of truncate, transversely disposed frame members 54. Said frame members are bolted down to bed 44 by bolt members 56 so that said frame members cannot move. This is important because, as mentioned earlier, urethane foam expands as it cures; frame members 50, sometimes hereinafter referred to as the frame means, resist such expansion.

Plywood board members 58, 60 are positioned in abutting relation to frame members 52, 54, respectively, inwardly thereof, and held against radially outward displacement by said immobile frame members. Boards 58 and 60 are shown in their disassembled configuration at the right hand side of FIG. 11 and are shown in their proper positions in the frame just to the left thereof. Tubes 62 are the stacking tubes which receive the dowel pin parts of "H"-shaped hinge members 22 depicted in FIG. 9 and are also shown in their unattached configuration at the far right of FIG. 11; they are shown attached to their associated truncate frame members 60 in the adjacent station. The stacking tubes 62 are press fit into throughbores formed in their associated truncate frame members to facilitate construction of the frame means; note that the outermost edge of each tube 62 is flush with the outermost edge of its associated frame member 60.

Each frame assembly may include four or more tubular members or hinge tubes 64; in the depicted embodiment, eight hinge tubes are shown. Two are mounted toward each end of the elongate plywood board members as shown in FIG. 11; the location of said hinge tubes may be changed as desired. Each hinge tube is press fit into a throughbore formed in its associated frame member 58 and is flush with the outermost edge thereof, just like hinge tubes 62. It should therefore be clear that when urethane foam is injected into the confines of each frame means, the stacking tubes 62 and the eight hinge tubes 64 will become filled with expanding foam if their respective open ends are not suitably closed. It should also be clear that if said open, or innermost ends of said stacking tubes and hinge tubes are closed off, then the finished display panel will have all of said stacking tubes and hinge tubes embedded therein, none of which will be filled with foam, and all of which will have an outermost end in open communication with the outer peripheral edges of the finished panel; all of this can be gleaned from an inspection of FIG. 11.

The innermost end of each stacking tube 62 is closed with a metallic plate 63 before foam injection begins and said plate 63 is held in place during the injection process by a piece of tape. The plate 63 keeps the stacking dowel pins or the posts of the "H"-shaped hinge means 22 from piercing the foam when contiguous panels are vertically stacked.

The first steps of the novel method include providing top plate 32, bed 44, and the means for lowering the top plate toward the bed and for raising said top plate, i.e., the telescoping post members 40 and the parts associated therewith. Next, frame means 50, including parts 52 and 54 as aforesaid, are assembled and bolted down with bolts 56 to thereby form a rigid frame means that resists foam expansion. Then, as shown in FIG. 12, a sheet of paper 66 is placed inside each frame 50, in overlying relation to bed 44. As shown in that Fig., the length and width of each sheet of paper 66 is equal to the length and width of the area bordered by frame members 52 and 54. The plywood members 58 and 60 are then positioned into overlying relation to said sheet of paper 66 and assembled into their frame-defining configuration; as mentioned earlier in connection with FIG. 11, the second frame station to the right in that Fig. shows the plywood members in their frame-defining configuration. The same configuration is also depicted in FIG. 14. FIG. 13 shows one each of the plywood members in position and the other two members in the process of being placed into position as indicated by the directional arrows in that Fig.

The next step is depicted in FIG. 14; a second sheet of paper 68 having a greater length and width than sheet 66 is then brought into overlying relation to frame 50. More particularly, and as shown in FIG. 14, second sheet 68 covers about half of truncate frames 52 and 54, although that particular dimension is not critical. The second sheet 68 may at least partially overlie the inner edges of frame members 52 and 54 so that the foam to be introduced into the cavity defined at its top and bottom by sheets 66 and 68 and at its sides by the plywood members 58 and 60 does not leak past the peripheral edges of said second sheet 68.

The means for sealing off the innermost ends of the stacking tubes 62 and hinge tubes 64 is also depicted in FIGS. 13 and 14. Masking tape 69 is the preferred closure means; it is applied to each open end of each stacking tube 62 and hinge tube 64 before second sheet 68 is placed into its operable position; preferably, it is applied even before the plywood members are placed into their frame-defining configuration. As mentioned earlier, stacking tubes 62 are plugged with metallic plate 63 before tape 69 is applied thereto.

After second sheet 68 is operatively deployed, top plate 32 is then lowered by suitable hydraulic or pneumatic means into overlying relation to said second sheet 68 and thus to each frame assembly. Plate 32, like bed 44, is made of steel or other suitable, very strong material and is pressed tightly against said frame assemblies to thereby form a very rigidly defined cavity between the first and second sheets of paper and the plywood members as aforesaid. Top plate 32, bed 44, and the plywood members backed by frame means 50 collectively form an immovable boundary-defining means.

The machine is now configured properly for the urethane foam injection procedure. As depicted in FIG. 15, a unique elongate wand 70 is introduced into the above-described cavity through an injection port 72 that is cooperatively formed in a preselected truncate frame member 54 and a preselected truncate plywood member 60. Note a similar port 73 formed in the same parts in opposing relation to injection port 72. Port 73 is an expansion port only, i.e., wand 70 is not introduced thereinto. The elongate extent of wand 70 enables its nozzle 74 to be introduced deeply into the cavity as shown in FIG. 15 so that foam 76 is injected into the furthest reaches of the cavity as soon as foam flow is initiated. Significantly, wand 70 is swept in a reciprocating lateral motion, as indicated by the double-headed directional arrow 78 in Figs. 15 and 16, as it is slowly withdrawn from the cavity as said cavity fills with foam. Initial expansion of foam results in some foam exiting the cavity through expansion port 73 as depicted. The foam is injected at low pressure; some prior art attempts to make urethane core panels are believed to have failed at least to some extent because high pressure foam injection was attempted.

When the cavity is about ninety five per cent filled, as depicted in FIG. 17, foam injection is stopped and wand 70 is withdrawn through injection port 72. An expansion tube 80 is then positioned into that part of port 72 formed in plywood member 60; as the foam expands, the cavity is filled and tube 80 acts as a relief valve as foam expands into it. As shown in FIG. 18, some of the foam 76 may travel out the open end of tube 80; that Fig. also shows the cavity completely filled with said foam.

FIG. 19 depicts the cavity when filled with foam as well; that Fig. is taken along line 19—19 in FIG. 18 and accordingly shows the stacking tubes 62, hinge tubes 64, and plywood members 58. Note that the outermost edge of each plywood member 58, 60 abuts its associated frame member 52, 54 and that sheets 66 and 68 overlie the top and bottom edges of each plywood member 58, 60. Upon hardening of the foam, the plywood members 58 and 60 become an integral part of the finished panel; the urethane naturally bonds thereto. The somewhat porous nature of the wood also allows the urethane to "breathe" during the curing process, thereby enhancing said process. The top plate 32 is maintained in its lowered disposition until curing is complete. When curing is complete, top plate 32 is raised and expansion tube 80 is removed from its FIG. 17 position, as indicated in FIG. 20; the removal of said tube causes the foam within it to snap off cleanly. A similar expansion tube 81 performs the same function in connection with expansion port 73.

Each panel 10 is then removed from apparatus 30; a removed panel is depicted in FIG. 21. FIG. 22 is an enlarged view showing how foam 76 bonds to the plywood members.

The novel double-acting hinge means is constructed by attaching opposite ends of a looped bungee cord 18 (FIG. 25) or other suitable elastic member to the respective innermost ends of confronting hinge tubes 64. The preferred attachment means is a spring device or retainer clip 92, made of piano wire or other suitable material, having a pair of legs that end in hooks that engage the innermost end of its associated hinge tube 64.

Since the innermost end of each hinge tube 64 is embedded in hardened foam 64, and since said ends are covered with tape 69, means are required to remove the tape and provide a clearance space to admit the hooked ends of the spring device. The preferred means is a hand tool 82 (FIG. 24) having an "L"-shaped shaft 84 as depicted in FIG. 23; shaft 84 terminates in a bent part 86. As shown in FIG. 24, shaft 84 is carried by handle 88 and is rotated about its longitudinal axis of symmetry as indicated by directional arrow 89 to create cavity 90 adjacent the innermost, embedded end of hinge tube 64. The frangible tape 69 is simply punched through as a prelude to the rotational action that creates void 90.

FIG. 25, as aforementioned, depicts attachment means 92 having hooked ends 94 that protrude into void 90 and engage the innermost end of each hinge tube 64; note the coiled section 93 of retainer clip 92 that engages bungee cord 18. The opposing end of looped bungee cord 18 is similarly engaged by the coiled section 93 of a second retainer clip 92 having hooked ends 94 that engage the innermost end of the hinge tube 64 that is in axial alignment with and which abuts the hinge tube depicted in FIG. 25, as is perhaps best understood by viewing FIG. 7 again, which Fig. shows cord 18 extending between adjacent abutting panels and holding them tightly together in edge-to-edge relation while allowing them to be disposed at any angular relation to one another.

Each stacking tube 62 may slidably receive a dowel pin 24 that has a length twice as long as each tube 62 so that it extends between and interconnects two vertically adjacent stacking tubes 62, as best understood in connection with FIG. 9. A side view of a tube 62 is provided in FIG. 27, which is taken along line 27—27 in FIG. 26. Still another view of a tube 62 is shown in FIG. 28, and FIG. 29 depicts a pair of tubes in abutting relation to one another and interlocked by dowel pin 24. Preferably, each dowel pin 24 is snugly press fit into its associated tube 62.

Where hinged interconnection of stacked panels is desired, the aforementioned "H"-shaped hinge means 22 is secured in said stacking tubes. More particularly, as shown in FIG. 9, each "H"-shaped hinge 22 includes a pair of laterally disposed dowel pins 26, 27 that are interconnected by an elastomeric member or bungee cord 28, mid-length thereof. Thus, the top half of leg 26 is press fit into a stacking tube 62 at the bottom of a top panel 16, and the bottom half of leg 26 is press fit into a stacking tube 62 at the top of a lower panel 16. Leg 27 is similarly situated in interlocking relation to a laterally adjacent pair of stacked panels. Thus, bungee cord 28 provides a double-acting hinge between laterally adjacent, stacked panels.

Paper sheets 66 and 68 are somewhat unsightly and unsuitable for use as the veneer for the completed display panel. Accordingly, sheets of felt 98, 100 or other suitable display panel covering are placed into overlying relation thereto as depicted in FIG. 30 and novel means are provided to connect the felt to the panel. In the claims that follow, sheets 98, 100 are referred to as the third and fourth sheets. Each sheet of said third and fourth sheets is adhered to first or second sheet 66 or 68 and is cut so that a part thereof overhangs all four edges of panel 10 as depicted in FIG. 30. The overhanging part or excess felt is then tucked into a saw cut 108 that is cut into the edge of each plywood member after the finished display panel is removed from the machine. Note in FIG. 30 that saw cut 108 extends into foam 76, but this is not critical to the invention.

A putty knife or similar common tool, denoted 102 in FIG. 31, includes handle 104 and flat blade 106. FIGS. 30-33 provide an animation showing how tool 102 is employed to tuck sheets 98 and 100 into saw cut 108. An adhesive is applied to the surfaces which sheets 98 and 100 will overlie when fully tucked into position.

FIG. 34 shows how the looped bungee cord 18 extends between the outermost ends of associated hinge tubes 64 when a pair of adjacent panels are folded one hundred eighty degrees with respect to one another.

Referring now to FIG. 35 and the Figs. that follow, it will there be seen that several embodiments of the novel hinge structure are more fully disclosed therein. The first embodiment, already disclosed, is denoted as a whole by the reference numeral 110.

It should be understood as aforesaid that said structure is embedded within a pair of display panels that are disposed in edge-to-edge relation to one another, as shown in FIG. 39.

Hinge 110 includes hollow tubes 64, 64 that abut one another as shown in FIG. 35 when in their position of repose.

As best understood in connection with FIGS. 36 and 37, an elastomeric bias means 18, which may be in the form of a bungee cord, is formed into a loop and its opposite ends are tied together or otherwise joined by a crimped sleeve member 19 or by any other suitable means.

Attachment members 92, 92 engage opposite ends of the looped cord 18 and also engage the inner ends of each tube 64, 64, as shown in FIGS. 35 and 36. The respective lengths of hinge tubes 64, cord 18 and attachment means 92 are preselected so that cord 18 is under tension when members 92, 92 engage their respective hinge tube inner ends as depicted in FIG. 36. This tension holds the arrangement of parts in the taut position of said FIG. 36.

Cord 18 and attachment members 92 are shown in repose in FIG. 37. Note that said attachment members 92 are shown in repose in FIG. 37. Note that said attachment members must be positioned into engaging relation to cord 18 before the opposite ends of said cord are joined together.

FIG. 38 shows the portion of the novel assembly when hinge tubes 64, 64 are disposed at an angle with respect to one another. The cord-engaging part or coils 93 of each attachment member 92 is also best shown in FIG. 38 as are the hooked trailing ends 94 thereof that engage the innermost ends of hinge tubes 64. Double-headed directional arrows 65, 65 indicate that hinge assembly 110 can also be swung in the opposite direction relative to the angle that is depicted.

It should also be understood from FIG. 38 that attachment members 92 have two legs, as shown, that are outwardly biased with respect to one another.

Hinge tubes 64 are shown embedded within panels 16 in FIG. 40, but a better understanding of the physical relation between the tubes and said panels is made possible in connection with FIG. 39. A thin layer of felt or other suitable material 98, 100 overlies opposite faces of its associated panel; note how the outermost end of each tube 64 is flush with its associated plywood member.

Elastomeric member 18 is taut as depicted. It is important to observe that the panels 16, 16 tightly abut one another along a seam 17 through which no light may pass. Note also that cavity 90 at the innermost end of each tube 64 provides clearance space that enables the installation of attachment means 92. The hinge tubes are otherwise embedded in urethane foam 76, or other suitable material, as aforesaid.

A top view of the panels is provided in FIG. 41. FIG. 42 shows the panels when disposed in orthogonal relation to one another.

Returning now to FIG. 40, note that auxiliary hinge tubes 64 are positioned adjacent the primary hinge tubes 64. This enables hinged engagement of three panels 16 in a "T" as depicted in FIG. 42, in radial array as shown in FIG. 43, four panels in radial array as depicted in FIG. 46, or in other radial patterns.

FIG. 44 is a detailed view showing adjacent panels in angular relation to one another; and FIG. 45 shows a lengthy chain of the panels of this embodiment that may be assembled.

An embodiment that allows an unlimited number of panels to be interconnected in any pattern, as depicted in FIG. 50, is provided by the form of panel interconnecting means shown in FIGS. 47–49 and 51.

The outermost end of each elastomeric member 18 is engaged by a hooked member 91 as shown in FIG. 47; as shown in FIGS. 49 and 51, panel arrangements such as that shown in FIG. 50 are assembled by simply hooking confronting hooks 9 to one another.

This invention is clearly new and useful. Moreover, it was not obvious to those of ordinary skill in this art at the time it was made, in view of the prior art when considered as a whole in accordance with the requirements of law.

Moreover, this invention pioneers the art of making thin urethane panels and means for hingedly interconnecting them. Accordingly, the claims that follow are entitled to broad interpretation, as a matter of law, so that the heart or essence of this breakthrough invention is protected from piracy.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method for making a thin panel having a foam core, comprising the steps of: providing a bed means in the form of a flat support surface made of a hard, inflexible material;

arranging a frame means atop said bed means to define an area within said frame means;

securing said frame means against movement by fixedly securing said frame means to said bed means;

inserting a first sheet of sheet material into overlying relation to said bed means after sizing said first sheet so that it fits within said area framed by said frame means;

positioning a plurality of board members into overlying relation to the peripheral edges of said first sheet so that said board members are disposed within the area bounded by said frame means and held against movement by said frame means;

forming an injection port within a preselected board member and a preselected contiguous part of said frame means;

positioning a second sheet of sheet material into overlying relation to said frame means to define a cavity boardered from below by said first sheet of material supported by said bed means, on its sides by said board members, and from above by said second sheet;

providing a flat top plate made of a hard, inflexible material, positioning said top plate into overlying relation relative to said second sheet of material, and securing said top plate against movement so that the cavity is bounded on all sides by immovable boundary-defining means;

inserting an elongate wand into said cavity through said injection port;

injecting an expandable foam into said cavity through said wand;

withdrawing said wand from said cavity as said cavity fills with foam;

raising said top plate and removing the panel from within said frame means after the foam has cured;

preattaching to preselected board members at least one tubular member that extends inwardly into said cavity;

closing the innermost end of said at least one tubular member with a frangible closure means to prevent foam from entering said at least one tubular member;

positioning the outermost end of said at least one tubular member in open communication with said frame means so that said outermost end is in open communication with the ambient environment when the panel is removed from said frame means;

breaking said closure means after said foam has cured; and boaring into said foam adjacent the broken closure means to provide a clearance space into which means for hingedly interconnecting adjacent panels are inserted.

2. The method of claim 1, further comprising the steps of moving the distal free end of the wand in a laterally reciprocating sweeping motion as said foam is injected into said cavity, withdrawing the wand as the cavity fills with foam, and injecting said foam at a predetermined low pressure.

3. The method of claim 2, further comprising the step of stopping the injection of foam into the cavity when the cavity is about ninety five per cent filled and withdrawing the wand from said cavity.

4. The method of claim 3, further comprising the step of positioning an expansion tube in said injection port after said wand has been withdrawn from said cavity and awaiting expansion of said expandable foam into said expansion tube.

5. The method of claim 4, further comprising the step of removing said expansion tube causing the foam within it to snap off cleanly.

6. The method of claim 5, further comprising the steps of making a longitudinally extending saw cut into an outermost edge of each of said boards, overlying said first and second sheets of material with associated sheets of covering material to enhance the aesthetic appearance of the panel, and tucking the respective ends of said sheets of covering material into said saw cuts.

7. The method of claim 6, further comprising the step of providing an elongate bed means and an elongate top plate means so that multiple panels may be constructed substantially simultaneously.

* * * * *